RE-ISSUE

DUNHAM AND WIDNEY'S COMPOUND LEVER CAR BRAKE

4465

REISSUED JUL 11 1871

WITNESSES

John F. Edmunds

J. H. White

—INVENTORS—

William H. Dunham

James Widney per S. P. Ross atty

Samuel P. Ross.

UNITED STATES PATENT OFFICE.

WILLIAM H. DUNHAM, OF HOKAH, MINNESOTA, AND JAMES WIDNEY, OF ALLEGHENY, ASSIGNORS OF PART INTEREST TO SAMUEL P. ROSS, OF PITTSBURG, PENNSYLVANIA.

IMPROVEMENT IN CAR-BRAKES.

Specification forming part of Letters Patent No. 71,591, dated December 3, 1867; reissue No. 4,465, dated July 11, 1871.

DIVISION A.

*To all whom it may concern:*

Be it known that we, WILLIAM H. DUNHAM and JAMES WIDNEY, the former now of Hokah, State of Minnesota, the latter of the city of Allegheny and State of Pennsylvania, have invented a certain Improvement in Car-Brakes; and having assigned a portion of our interest in the same to SAMUEL P. ROSS, of the city of Pittsburg and State of Pennsylvania aforesaid, the following is a specification:

The invention consists of a new and improved car-brake, arranged by means of levers, pulleys, rods, and chains, so that the brake-beams may be dispensed with and a compound leverage obtained for bringing the brake to bear with force upon the truck-wheels.

Figure 2:
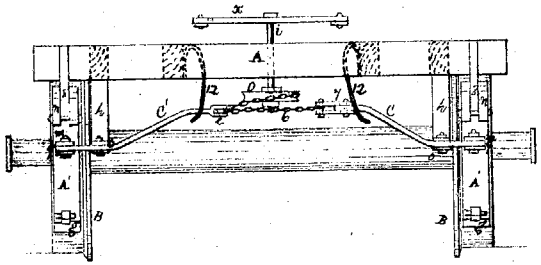
Figure 1:
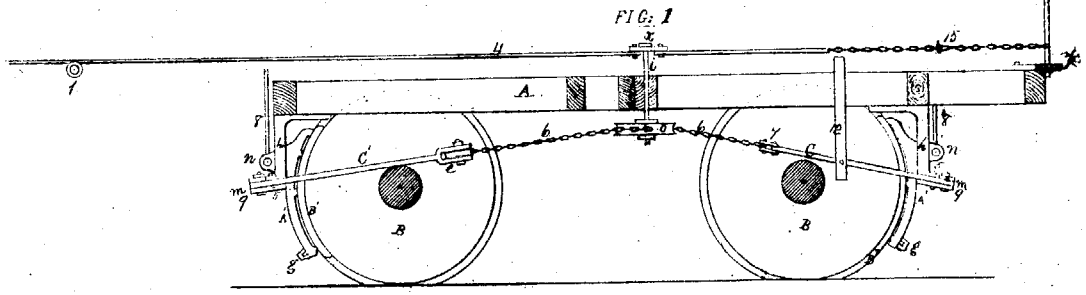
Figure 3:
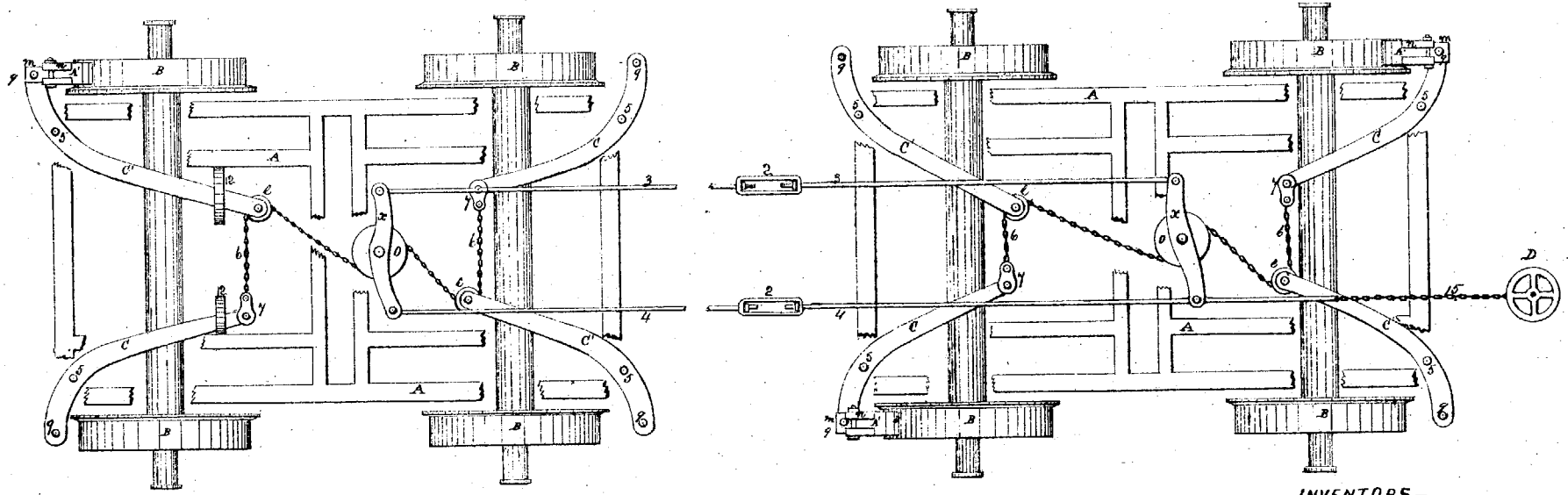

The accompanying drawing represents the machine and its parts. Figure 1 is a longitudinal section of a car-truck provided with our improvement. Fig. 2 is an end view of the same, and Fig. 3 is a top view of the trucks of a car with portions of the frame broken away for the purpose of showing the improvement.

The car-truck and wheels are constructed and arranged in the ordinary manner. A is the truck-frame. B B are the wheels. C C′ represent iron levers, held in their proper positions by slotted hangers or supports *h*, made of wrought or cast-iron and bolted to the truck-frame A. 5 are bolts passing through the ends of the slotted supports or hangers *h* and through the levers C C′, about three to five inches from their outer ends, where they are attached to the brake-heads. These bolts act as pivots, upon which the levers are allowed to turn freely. On the inner ends of the levers C are pivoted links 7, to which is attached a chain, 6, which passes around a pulley, *e*, on the end of lever C′, and is connected to the pulley *o* on the shaft *i*, on the upper end of which is secured a transverse lever, *x*, to which are attached the connecting-rods 3 and 4, provided with swivel-links 2. To one end of the connecting-rod 4 is secured a chain, 15, which is attached to the ordinary brake-shaft D.

When it is desired to operate the brake the hand-shaft is turned and the chain 15 wound up, which will, by means of the transverse levers *x*, draw forward the rod 4 and force back the rod 3 and cause the pulley *o* to wind up the chain 6, thus drawing the ends of the levers C C′ toward each other and forcing the brake-shoes against the wheels B. The levers, after being thus operated, are held stationary by the usual appliance of a pawl and ratchet-wheel, indicated at *x′*. When the pawl is tripped the springs 12 cause the levers C C′ to assume their original position and thereby relieve the brakes from the wheels.

We claim—

The levers C C′, pivoted to the hangers or slotted supports *h*, and made inoperative by the springs 12, the whole constructed, arranged, and operated as described.

JAMES WIDNEY.
S. P. ROSS.
W. H. DUNHAM.

Witnesses:
WILLIAM F. ROBB,
GEORGE OGDEN,
JAMES E. ANDERSON,
L. S. KEELER.